Fig.7ª

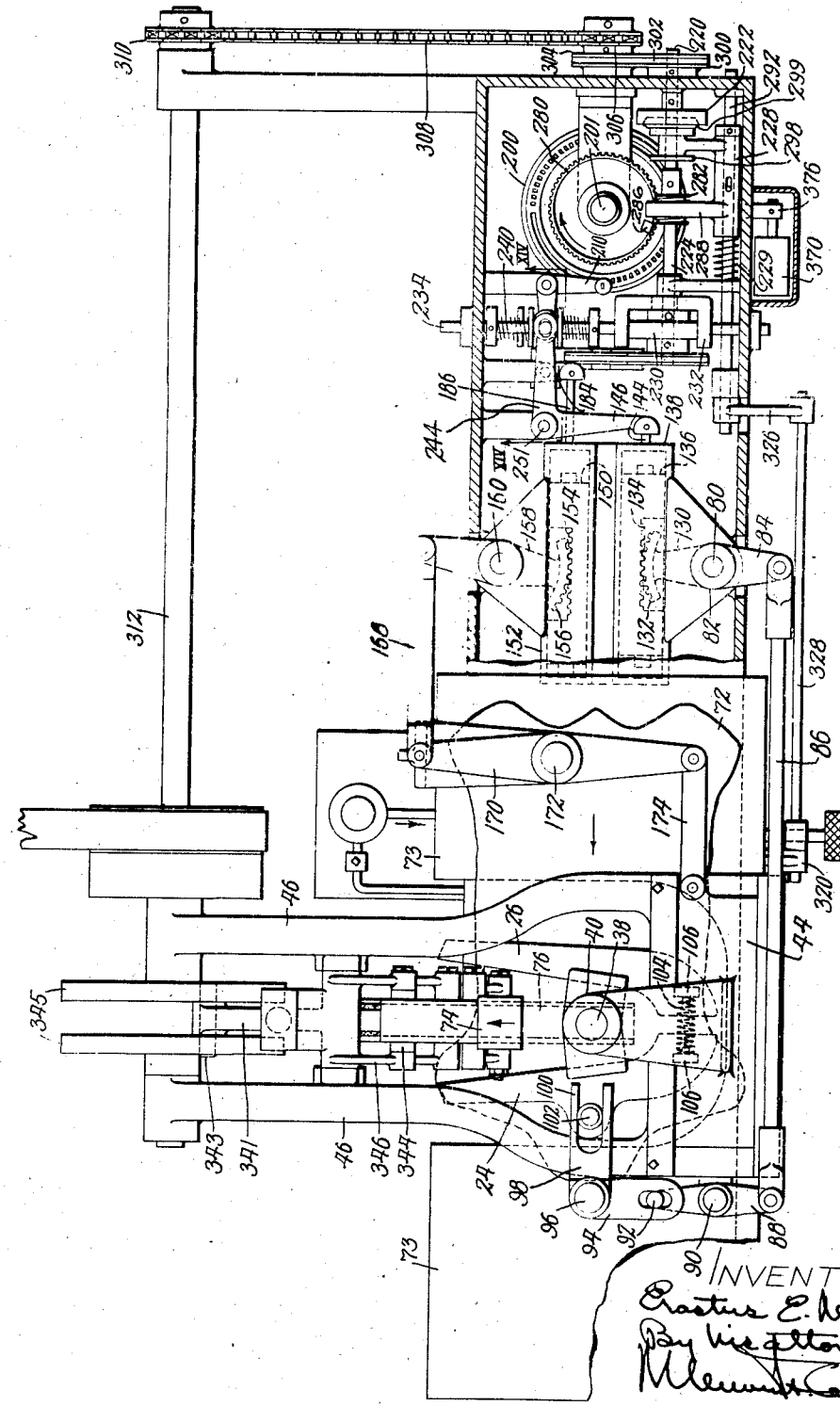

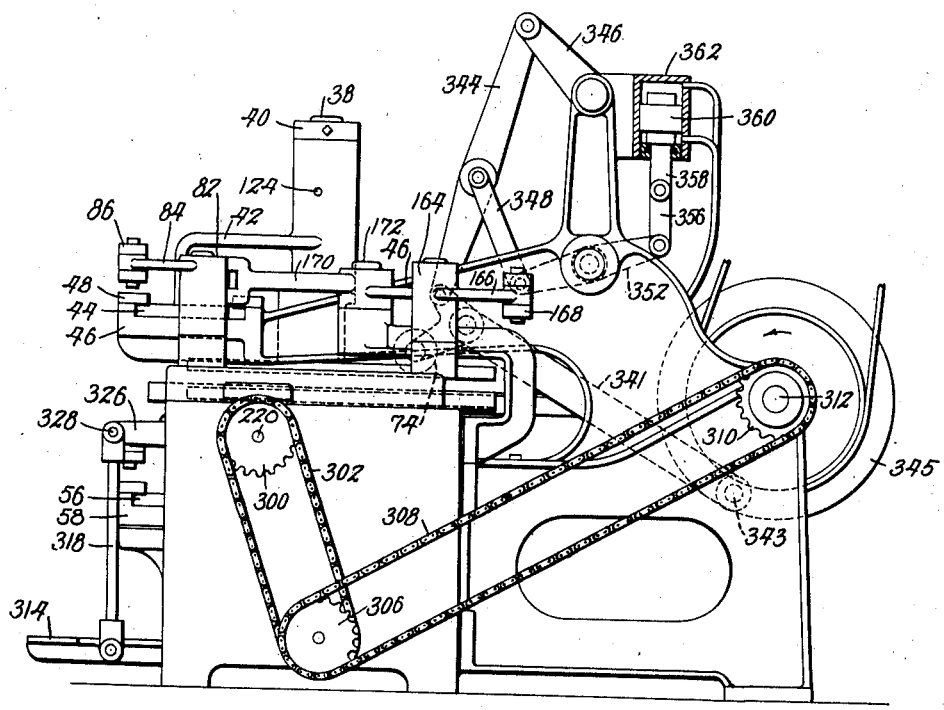

INVENTOR
Erastus E. Winkley
By his Attorney

Aug. 3, 1943.  E. E. WINKLEY  2,325,724
LEATHER MANUFACTURING MACHINE
Filed July 23, 1941   7 Sheets-Sheet 4
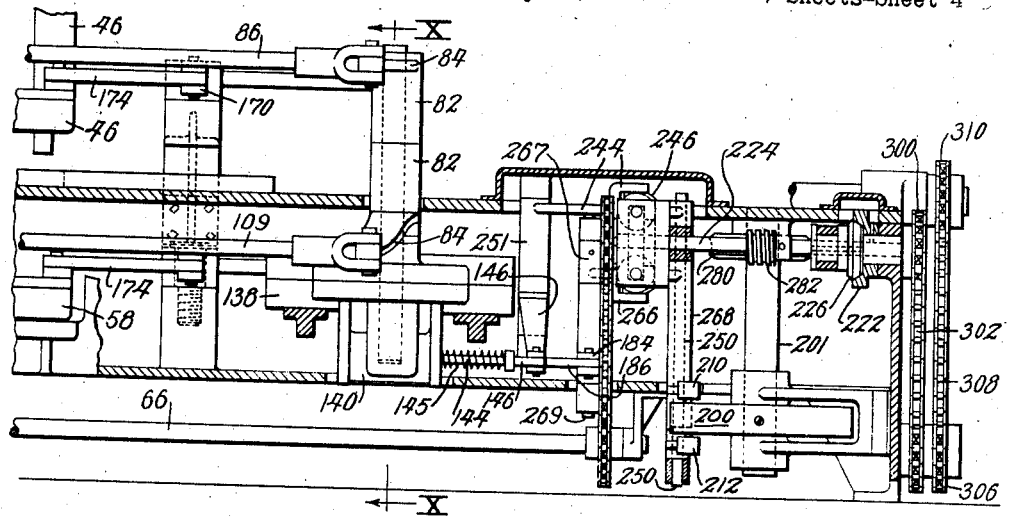
Fig. 9.
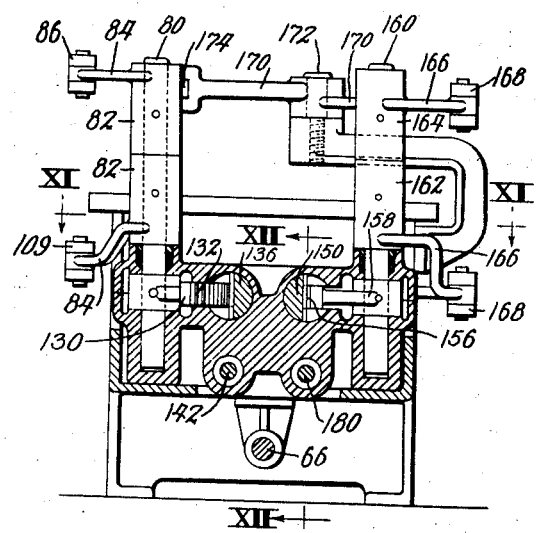
Fig. 10.
Fig. 11.
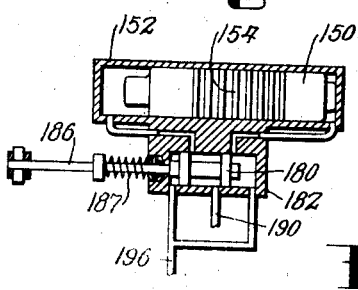
Fig. 12.
INVENTOR
Erastus E. Winkley
By his Attorney Aug. 3, 1943.  E. E. WINKLEY  2,325,724
LEATHER MANUFACTURING MACHINE
Filed July 23, 1941  7 Sheets-Sheet 5

INVENTOR
Erastus E. Winkley
By his attorney

Aug. 3, 1943.  E. E. WINKLEY  2,325,724
LEATHER MANUFACTURING MACHINE
Filed July 23, 1941  7 Sheets-Sheet 6
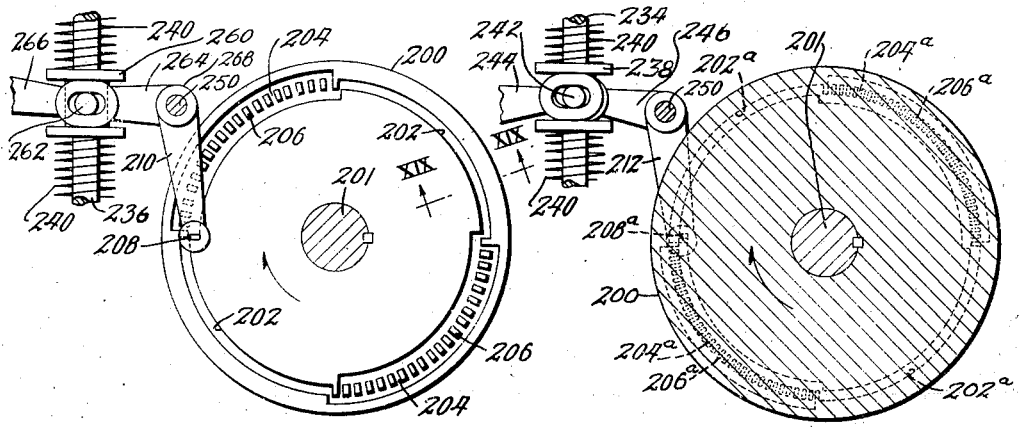
Fig.18.  Fig.20.
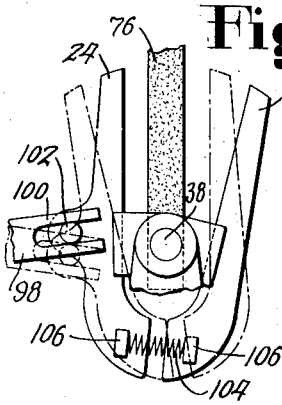
Fig.19.
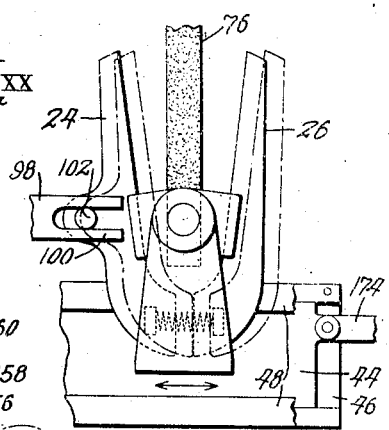
Fig.21.
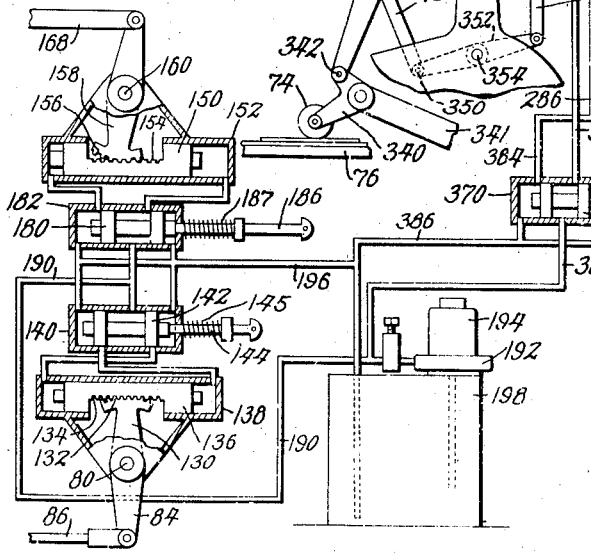
Fig.22.
Fig.23.
INVENTOR
Erastus E. Winkley
By his attorney Aug. 3, 1943.  E. E. WINKLEY  2,325,724
LEATHER MANUFACTURING MACHINE
Filed July 23, 1941  7 Sheets-Sheet 7

INVENTOR
Erastus E. Winkley
By his attorney

Patented Aug. 3, 1943

2,325,724

UNITED STATES PATENT OFFICE 2,325,724

LEATHER MANUFACTURING MACHINE

Erastus E. Winkley, Lynn, Mass., assignor to United Shoe Machinery Corporation, Flemington, N. J., a corporation of New Jersey Application July 23, 1941, Serial No. 403,595

27 Claims. (Cl. 69—46)

This invention relates to machines for operating upon sheet material such as hides and skins. While the invention is illustrated as embodied in a machine for glazing tanned hides and skins, it is to be understood that the invention and various important features thereof may have other applications and uses.

In certain of the machines employed in operations upon hides and skins, a tool is reciprocated back and forth over a work piece, alternately in idle and work treating strokes, in an arrangement in which the operator must shift the work piece during the idle strokes of the tool in order that contiguous areas or portions of the work piece may be successively treated, the operations being carried out until all portions of the given work piece have received substantially the same treatment. At the present time, brushing, glazing, rolling, stoning, staking, and whitening machines employed in the treatment of tanned hides and skins comprise tools which are operated in the manner just described. It follows that much manual labor and considerable skill are involved, particularly in glazing and staking operations, with the present types of machines.

Objects of this invention are to minimize the manual labor and skill heretofore required in these and similar operations and to increase correspondingly the output of the operator. These objects have been attained since the operator may attend several of the machines in a given time, due to improvements directed to automatic positioning and feeding of work pieces introduced in succession in a line of the machines by the operator.

Since, in the treatment of hides and skins, the path of the tool should vary in its direction to suit the requirements of different portions of each hide or skin, an important feature of the invention resides in the provision of means for shifting the work piece step by step in a directly lateral direction, thereby providing for treatment of the work piece along successive paths extending, for example, in directions at right angles to the backbone line of the given hide or skin, the work positioning and feeding means becoming subsequently operative to shift the work piece rotatably about a center in either the forepart or the hind part of the hide or skin to effect treatment of the front or the rear shank portions of said hide or skin. In each case, the amount of shifting movement is such that each successive path of the tool overlaps the preceding path on the surface of the work piece, thereby insuring that no portion of the work piece escapes treatment.

In the illustrated machine, a control member is provided for determining the sequence of the directly lateral and of the rotative movements of the work feeding device, the said control member also determining the number of such directly lateral shiftings of the work piece by the work feeding device and also the number of rotative steps or movements of the work piece by the same work feeding device. Through the operation of this control member a work piece placed in the machine will be shifted step by step in a straight line while a tool is operating on a certain portion of such work piece and then the latter will be shifted rotatively while the tool is operating on another portion of the work piece, this rotative movement of the work piece being followed in turn by another straight line shifting thereof and again by a rotative shifting of the work piece to complete the treatment of the same.

Conveniently the means for moving the work feeding device in both its straight line and rotative movements is fluid operated, the time and number of operations of said fluid operated means being determined by said control member.

In a preferred embodiment of the invention, the work piece positioning and feeding means comprise clamping devices spaced from each other somewhat more than the width of the tool in an arrangement in which the sets of clamping devices are mechanically operated to move away from each other sufficiently to place a portion of the work piece under tension just prior to the operation of the tool thereon, thereby placing the work piece in condition for efficient operation of the tool.

These and other important features of the invention and novel combinations of parts will now be described in detail in the specification and then pointed out more particularly in the appended claims.

In the drawings,

Fig. 1 is a plan view, partly in section, from above of a machine illustrating one embodiment of the invention;

Fig. 2 is an end view looking from the right in Fig. 1;

Fig. 3 is a plan view of a skin in position on a work support, and illustrating diagrammatically the step-by-step manner in which the skin is treated in the illustrated machine;

Fig. 4 is a side view of a glazing tool and of the lever mechanism for operating it;

Fig. 7a is a sectional view taken along a line above the pin in Fig. 7;

Fig. 9 is a front view, and partly in vertical section, of the machine shown in Fig. 1;

Fig. 10 is a view, partly in section, taken along the line X—X of Fig. 9;

Fig. 11 is a view of a mechanical detail taken along the line XI—XI of Fig. 10;

Fig. 12 is a view of a hydraulic detail taken along the line XII—XII of Fig. 10;

Fig. 18 is a detail of a control mechanism for the work clamping members showing a top plan view of the control member;

Fig. 19 is a sectional view along the line XIX—XIX of Fig. 18;

Fig. 20 is a sectional view of the control member taken along the line XX—XX of Fig. 19;

Fig. 21 is a detail view of part of the means for causing directly lateral shifting of the work clamping members;

Fig. 22 is a detail view of part of the means for causing rotary movement of the work clamping member;

Fig. 23 is a diagrammatic view giving details of fluid-operated means for causing both rotative and directly lateral shifting of the work clamping members and also of fluid-operated means for applying pressure to the glazing tool;

Figure 6:
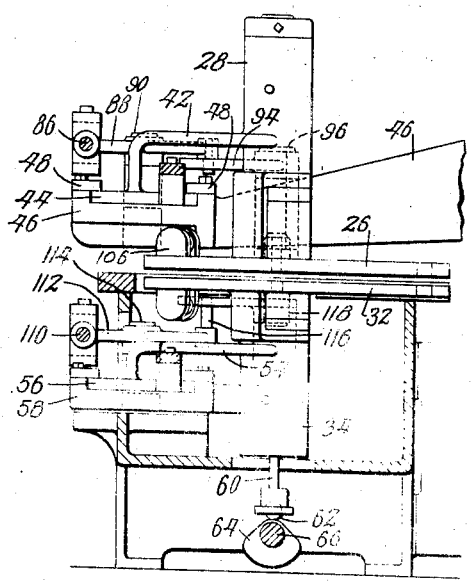
Fig. 6 is a view taken along the line VI—VI of Fig. 5.

In the drawings, which disclose a machine specially designed to feed a work piece during treatment by a reciprocatory glazing tool, there are provided two pairs of work clamping members of which the upper pair, comprising clamping members 24, 26 (Figs. 6 and 7), have upwardly projecting portions mounted to turn rotatably in a hub member 28, while the lower work clamping members 30, 32 have downwardly projecting portions mounted to rotate within a hub member 34. Upon closer inspection of Fig. 7, it will be observed that the clamping member 26 has a sleeve portion 36 rotatably mounted within the hub member 28 and that the work clamping member 24 is secured rigidly to the lower end of a shaft 38 rotatable within the sleeve 36, and that both the sleeve 36 and the shaft 38 are held in proper relation to the hub member 28 by a collar 40 fastened to the upper end of the shaft 38. Upon inspection of Fig. 6, it will be observed that the hub member 28 is supported by an arm 42 rigidly secured to said hub member 28 and a slide member 44 slidably carried in guideways in forwardly projecting frame members 46, the slide member 44 being held against upward displacement by overhanging guide members 48. It will be understood that the upper work clamping members 24 and 26 are movable rotatably about the axis of the shaft 38 (Fig. 7) and that they are also movable bodily in a straight line because of their attachment to the slide member 44 (Fig. 6).

Figure 7:
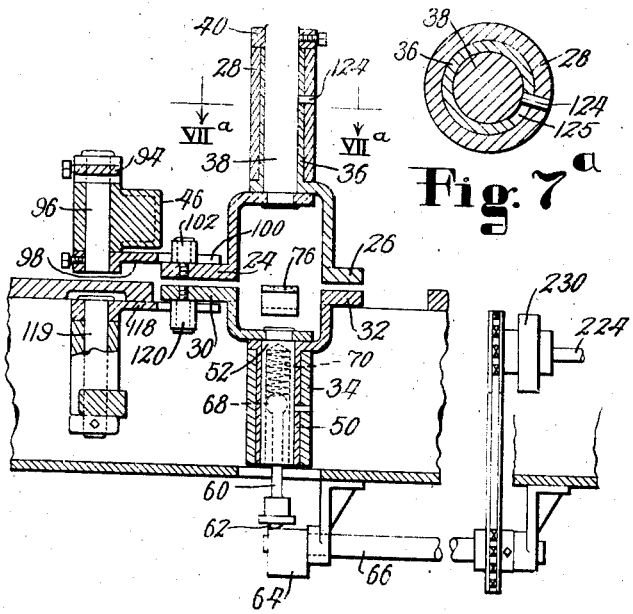
Fig. 7 is a sectional view taken along the line VII—VII of Fig. 5.

The lower work clamping members 30, 32 are rotatable about an axis passing vertically and centrally through the hub member 34 (Fig. 7). As shown, the work clamping member 32 has integral therewith a sleeve member 50 rotatable in the hub member 34 while the work clamping member 30 is rigidly attached to a hollow shaft 52 rotatably mounted within the sleeve 50. Upon reference to Fig. 6 of the drawings, it will be observed that the hub member 34 is supported by an arm 54 which is rigidly secured to the hub member 34 and to a slide member 56 slidably mounted in guideways in a frame member 58 in a manner similar in all respects to the slide member 44 and its mounting in the frame members 46. From an inspection of Figs. 6 and 7, it will be observed that the two pairs of work clamping members are mounted for rotative movement about the same vertical axis passing centrally through the shafts 38 and 52 (Fig. 7). Furthermore, the two pairs of work clamping members may be shifted in directly lateral directions by simultaneous movement of the two slide members 44, 56 by means which will hereinafter be described.

Figure 8:
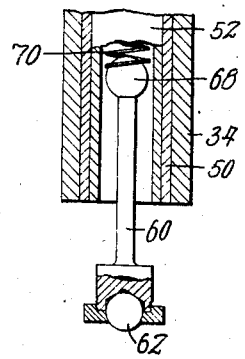
Fig. 8 is a detail view of part of the means for causing relative approaching movement of the work clamping members.
Figure 14:
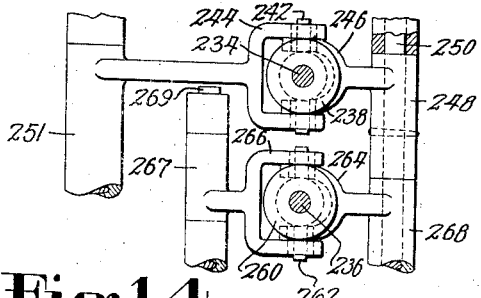
Fig. 14 is a sectional view taken along the line XIV—XIV of Fig. 1.

Upon reference to Fig. 7 of the drawings, it will be observed that the upper pair of work clamping members 24, 26 are spaced from the lower pair of work clamping members 30, 32 so that a piece of work may be readily introduced between the clamping members. Means is provided for causing relative approaching movement of the upper and lower pairs of work clamping members to clamp a work piece, the said means, in the illustrated construction, comprising a connecting rod 60 (Figs. 6, 7 and 8) which carries at its lower end a ball 62 rotatably mounted in a socket in said end, the said ball 62 being provided for engagement with an eccentric 64 rigidly attached to a shaft 66. At its upper end the connecting rod 60 is provided with a ball end 68 which presses against a spring 70 housed in the hollow shaft 52. In Figs. 6 and 7, the connecting rod 60 is in contact with the low part of the eccentric 64 and hence the lower work clamping members 30, 32 are in their lowermost position due to the effect of gravity. Upon a half revolution of the shaft 66 and of the eccentric 64, the connecting rod 60 will be moved upwardly its full distance thereby elevating the lower work clamping members 30, 32 yieldingly to work clamping position with respect to a piece of work positioned between the upper and lower work clamping members. It will be understood, of course, that the elevation of the lower work clamping members 30, 32 takes place in timed relation to rotary and straight line shifting movements of the work clamping members in their feeding operations upon the work piece. In this connection reference may be had to Fig. 3 of the drawings, wherein there is shown a skin 72 with dash lines thereon to show the path of a glazing tool 74 in its successive operations upon the skin. Conveniently, the skin is placed initially on a divided work table 73 and between the upper and lower clamping members with a center C of the skin on the center line of a work supporting bed 76. Upon starting the machine in operation, the work clamping members will close on the skin and shift the latter in successive steps to the left in Fig. 3 and between each feeding step the glazing tool 74 makes an operative stroke away from the front of the machine whereby the said tool contacts the skin at or near the backbone line thereof and then travels toward the margin of the skin in a straight line. In the illustrated skin, the glazing tool 74 makes ten strokes between successive shiftings of the skin 72 in a straight line toward the left in Fig. 3. At the end of the ten shiftings, the center D of the skin has reached the original position of the center C, whereupon the straight line shifting means for the work clamping members is discontinued, to be followed by rotative movements of the work clamping members to shift the skin about the center D, during which time the glazing tool 74 travels outward in radial directions from the center D. At the end of eighteen such rotative shiftings of the skin, the rotative means for the work clamping members becomes inoperative and the skin is again shifted in a directly lateral direction so that the tool moves along paths at right angles to the backbone line of the skin until it is time for the skin to be rotatively shifted again when it reaches the center C.

Figure 5:
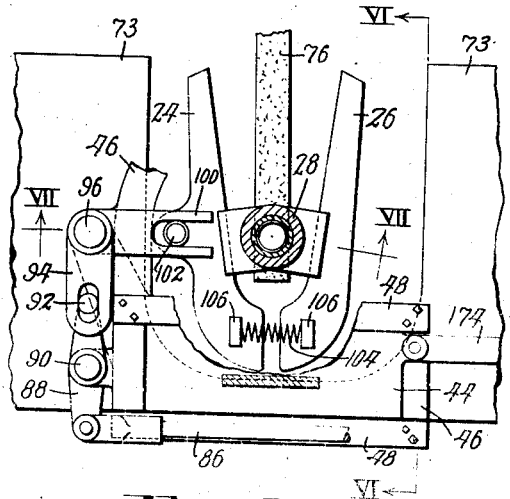
Fig. 5 is a detailed view showing means for rotating work clamping members for shifting a work piece about a given center in the latter.

For rotating the upper pair of work clamping members 24, 26, there is provided means comprising a shaft 80 (Figs. 1 and 10), said shaft having secured thereto upper and lower sleeves 82 each having rigidly secured thereto a lever arm 84. To the upper lever arm 84 is pivoted a connecting rod 86 (Fig. 1) pivoted at its other end to a lever 88 (Figs. 1, 5 and 6) movable about a vertical pivot pin 90 and having at its other end a stud 92 receivable in a slot in an arm 94 secured to the upper end of a shaft 96 (Figs. 5, 6 and 7) mounted in a stationary part of the machine frame, the said shaft 96 having a second lever arm 98 secured to its lower end. As shown, the lever arm 98 has a slotted or forked end 100 in which is slidably received a roller on a pin 102 extending upwardly from an ear on the adjacent work clamping member 24. Upon rocking the shaft 80 in a clockwise direction (Fig. 1), the work clamping member 24 is rotated in a counterclockwise direction (Figs. 1, 5 and 22). Movement of the work clamping member 24 in the direction just mentioned results in movement of the work clamping member 26 in the same direction, due to compression of a spring 104 which is located between two abutments 106 located, respectively, on the rear ends of the clamping members 24 and 26 (Figs. 5 and 22). This rotative movement of the work clamping members 24 and 26 is accompanied by corresponding rotative movement of the work clamping members 30, 32 by means later described herein. If, at the time of this rotative movement of the work clamping members, the lower members have been moved upwardly into work clamping relation with respect to the upper clamping members, then the work piece is given a feeding movement of one step. Such a rotative feeding movement of the work clamping members takes place after the skin 72 has been moved to the left in Fig. 3 far enough to bring the center D to the location previously occupied by the center C. Having moved the work piece one step about the center D, the work clamping members must separate and then return in a clockwise direction to seize the work as a preliminary to another feeding movement in a counterclockwise direction.

The lower pair of work clamping members 30, 32 are rotated at the same time as the upper pair of work clamping members by connections to the lower lever arm 84 (Fig. 10), said connections including a connecting rod 109 (Fig. 9) identical with the rod 86 (Fig. 1), rod 109 being connected at its left-hand end 110 (Fig. 6) to a lever 112 pivoted at 114 on the frame of the machine, said lever 112 having an upstanding pin 116 which is receivable in a slot in a bellcrank lever 118 mounted on a vertical shaft 119 (Fig. 7), the other end of which is also slotted to receive a roller 120 pinned to an ear on the lower work clamping member 30. It will be clear, therefore, that the lower work clamping members are given the same rotary movement as the upper clamping members both in time and in extent.

A pin 124 is set in hub 28 and extends into a limit slot 125 in sleeve 36 to stop sleeve 36 at a predetermined point in the rotative movement of the two clamping members 24, 26 while permitting 24 to continue for a distance beyond to put tension on the portion of the sheet material between the clamping members. A similar arrangement is provided in the lower hub 34 and sleeve 50.

As indicated in Figs. 1 and 10, the vertical shaft 80 is given its rotative movements by means of an arm 130 secured to said shaft and having a segmental rack 132 integral therewith and arranged to be constantly in mesh with a rack bar 134 integral with a piston 136 (Figs. 1 and 23) in a cylinder 138. The piston 136 is conveniently fluid-operated, the pressure medium being introduced alternately into opposite ends of the cylinder 138 by means of a valve mechanism including a cylinder 140 (Fig. 23) and a double valve device 142 slidable in the cylinder 140 alternately to open ports leading to opposite ends of the piston cylinder 138. For moving the valve member 142 in opposite directions there is pivotally attached to the outer end of the valve stem 144 (Figs. 1 and 23) one end of a valve operating lever 146 operated in a manner that will hereinafter be described. As shown, the valve stem 144 has a spring 145 surrounding it between a collar on the stem and the end of the cylinder 140 to tend to maintain the valve in the position shown and to prevent lost motion.

For reciprocating the slides 44 and 56, thereby to move the work clamping members back and forth in directly lateral directions, there is provided a piston 150 (Figs. 1, 10, 12 and 23) similar to the piston 136, the said piston 150 being slidable in a cylinder 152 and having a rack bar 154 in mesh with a segmental rack 156 on a lever arm 158 secured to the lower end of a vertical shaft 160 which carries secured thereto two sleeves 162, 164 (Fig. 10) each having fixedly secured thereto an arm 166 to the outer end of each of which is pivoted a connecting rod 168 (Figs. 1 and 10). To the other ends of each of the connecting rods 168 is pivoted one end of a lever 170 rotatable about an axis 172, said lever 170 having pivoted to its opposite end a link 174 in turn pivoted to one of the two slide members 44 or 56. In Fig. 1 the parts 168, 170 and 174 are shown in plan view. It will be understood the set of similar parts for operating the lower slide 56 (Fig. 6) will be found directly under the parts 168, 170 and 174 (Figs. 1 and 10) as indicated in Fig. 11 which is a view below the level of the skin. It follows that the slide members 44 and 56 are reciprocated together upon rocking movement of the vertical shaft 160 produced by reciprocation of the piston 150 in the cylinder 152. During movement of the slide members 44 and 56 to the left in Fig. 1, the lower pair of clamp members 30, 32 will be held in an upper work clamping position by the eccentric 64 (Fig. 7). Hence, during this movement of the clamp members to the left in Fig. 1, the skin is moved one step to the left by straight line shifting of the clamping members. At the end of this movement the clamping members are separated, the lower work clamping members 30, 32 moving downward by gravity, during rotation of the eccentric 64, until they reach their lowest position shown in Figs. 6 and 7. Then the work clamping members are moved directly to the right in Fig. 1 in their separated condition in order to take a fresh grip of the work piece. At the end of the idle movement, the lower work clamping members are again moved upwardly to clamp the work piece, after which the operative stroke or movement of the clamping members takes place once more to the left (Figs. 1 and 3).

Reciprocatory movements of the piston 150 in the cylinder 152 are caused by admitting a pressure medium alternately to opposite ends of the cylinder 152 (Fig. 23), control of the pressure medium being secured by operation of a double valve member 180 in a valve cylinder 182 upon movement of the valve member 180 by a valve operating lever 184 (Fig. 1) pivoted to valve stem 186 of the valve member 180, a spring 187 being provided to tend to maintain the valve in the position shown in Fig. 23.

Pressure medium under pressure is supplied to both the valve cylinders 140 and 182 through a pipe 190 (Fig. 23) connected to a pump 192 operated by a motor 194, there being a return pipe 196 which opens into the lower part of the reservoir 198.

For controlling both the rotative and straight line movements of the work clamping members, there is provided a controlling mechanism of which the most important member is a controller disk 200 (Figs. 1, 9, 13, 16, 18, 19 and 20) secured to a vertical shaft 201. This controller disk 200 has an upwardly facing surface provided with controller grooves 202, and controller passageways 204 (Fig. 18). On its lower face (Fig. 20), the controller disk 200 has corresponding controller grooves 202a and controller passageways 204a, the groove 202 in the upper face being directly above the group of passageways 204a in the lower face of the disk. Upon inspection of Figs. 18, 19 and 20, it will be observed that the passageways 204, 204a pass laterally back and forth between successive teeth or projections 206 or 206a. A pin 208 in a lever arm 210 (Fig. 18) travels along the groove 202 in the upper face of the controller disk 200 while a pin 208a in a lever arm 212 (Fig. 20) is moving back and forth in the passageway 204a directly below said groove 202, the purpose here being to control the operations of one of the work clamp shifting and work clamp rotative devices while the other is inoperative. The necessity for this arrangement will be obvious upon inspection of Fig. 3. In the position of the skin 72 in Fig. 3, the work piece is being shifted step by step in a directly lateral direction through reciprocation of the slides 44 and 56 which carry both the upper and the lower work clamping devices in both the idle and operative strokes thereof. On the other hand, when the skin has been moved in a directly lateral direction step by step until the center D reaches the point previously occupied by center C in Fig. 3, the sidewise shifting of the work clamping devices is terminated and the rotative movement of the work clamping devices is begun to move the skin step by step about the center D.

In the illustrated construction, the top surface of the controller disk 200 is provided with twenty passageways between the studs or teeth 206 to give ten directly sidewise movements to the skin 72 indicated by the lines passing at right angles to the backbone line of the skin in Fig. 3, while on the under side of the same disk the passageways 204a, thirty-six in number (this exact number not shown since too much reduction in size of passageways would be necessary), provide for the rotative movement of the work clamping devices to move the skin 72 rotatively for eighteen steps about the center D. It will be understood, of course, that the number of directly lateral steps during which the glazing tool travels along paths at right angles to the backbone line will preferably vary with different sizes of skins and hence the skins should be sorted to present batches of skins of about the same size for the machine constructed as shown in the drawings, and particularly for the controller disk 200. However, if the number of steps of directly lateral movement of the work piece be suited exactly to a skin of a given size, it would make no great difference if a skin somewhat shorter or longer, along the backbone line, be shifted to rotate about a center in one end of the skin which is the same distance from the transverse median line of the skin as that shown in Fig. 3, provided only that all portions of a larger skin are within the range of movement of the tool and hence receive treatment. For a batch of considerably larger skins, it will be desirable to provide a different arrangement of controller grooves and passageways in a controller disk which may be readily substituted for that shown in the machine.

Figure 15:
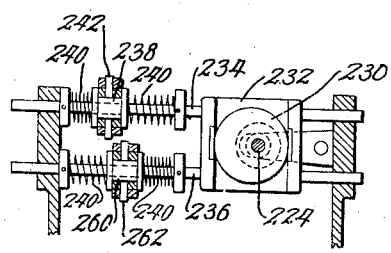
Fig. 15 is a sectional view taken along the line XV—XV of Fig. 13.

In order that the controller disk 200 may control the operation of the valve pistons 142 and 180 in the valve cylinders 140 and 182, respectively, there is provided a yielding connecting means which will now be described. Upon reference to Figs. 1, 13, 14, 15 and 16 it will be observed that a driving shaft 220 (Figs. 1 and 13) having a clutch member 222 secured thereto is arranged in line with a shaft 224 having a cooperating clutch member 226, the arrangement being such that the clutch member 226 is moved into engagement with the clutch member 222 by an arm 227 extending from a sleeve 228 operated in one direction by a spring 229, with the result that the shaft 224 is driven from the shaft 220, it being understood that the clutch member 226 is slidable on shaft 224 but is keyed to rotate therewith, as will be described hereinafter in more detail. In the illustrated construction, the shaft 224 carries fixedly secured to its other end an eccentric or cam member 230 rotating in a yoke 232 to which are secured a pair of shafts 234, 236 (Fig. 15). On the shaft 234 there is provided a collar 238 on each side of which are springs 240, the result being that the collar 238 is moved yieldingly back and forth during the reciprocation of the yoke 232 by the cam 230.

As shown, the collar 238 has extending in opposite directions therefrom a pair of pins 242 which are receivable in the forked and slotted ends of overlapping yoke members 244, 246 (Fig. 14) the yoke member 246 being secured to a sleeve 248 pinned to a vertical shaft 250 to the lower end of which is pinned the lever arm 212 (Figs. 9 and 20) having its pin 208a for engagement alternately with the controller grooves and controller passageways in the lower face of the controller disk 200. In the illustrated construction, the yoke member 244 is integral with a sleeve 251 (Figs. 9 and 14) having fixedly secured thereto the valve operating lever 146 which controls the operation of the piston 136 (Figs. 1 and 23) for the rotative shifting of the work clamping members.

The other shaft 236 (Figs. 14, 15 and 18) extending from the yoke member 232 (Fig. 15) has a collar 260 having pins 262 projecting in opposite directions therefrom for engagement with forked and slotted yoke members 264, 266, the yoke member 264 being at the end of an arm which is integral with a sleeve 268 loose on the shaft 250 (Figs. 9, 14, 16), the lower end of the sleeve 268 having secured thereto the lever arm 210 (Fig. 18), the latter carrying the pin 208 for movement along the grooves 202 and alternately through the passageways 204 in the upper face of the controller disk 200. The other yoke member 266 (Fig. 14) is integral with a sleeve 267 which is fixed to a shaft 269 (Figs. 9 and 14) to which is fixed one end of the valve operating lever 184 (Figs. 1, 9) which is pivoted to the valve stem 186 (Fig. 23) to control the piston 150 in the piston cylinder 152, in reciprocations by which the work clamping devices are given straight line reciprocations to move the skin 72 step by step in directly lateral movements, as indicated in Fig. 3 of the drawings.

It will be understood that the rapid vibration of the lever arms 210 and 212 by the yielding means comprising the yoke member 232, and the shafts 234 and 236 through the yieldingly connected collars 238 and 260, will cause the pin 208 of the lever arm 210 (Fig. 18) to move back and forth along the passageway 204 between the teeth 206 during rotation of the controller disk 200 which is driven at a predetermined rate, as will be hereinafter described. While the pin 208 is in the groove 202 (Fig. 18) the vibratory movements of the yoke 232 are yieldingly absorbed as far as the lever mechanism controlled by the controller member 200 is concerned. As indicated, however, when the pin 208 enters the wider groove which includes the row of pins 206 in its center part, the pin 208 travels from one side of the wider groove to the other, passing between adjacent teeth 206, and thus movement is transmitted to move the valve 180 alternately in opposite directions to operate the clamping members in straight line feeding of the skin. It will be understood that engagement of the pin 208 with a tooth 206 is only temporary and yielding since the controller disk 200 is moving at a rate to permit passage of the pin 208 from side to side of the row of teeth 206. When pin 208 is in a groove 204 (Fig. 18) the pin 208a is in a simple curved groove 202a and when pin 208a enters a group of passageways 204a to operate the valve member 142 to cause rotative movement of the work clamping members, the pin 208 is in a simple curved groove 202 in the upper surface of the controller member 200. In this way, the operation of the means for giving in alternation rotative or straight line movements of the work clamping means is secured in a manner to predetermine the number of the rotative and the number of the straight line shifting movements of the work clamping members and in order to secure step-by-step movement of the skin in place beneath the glazing tool in a manner to insure proper treatment of all portions of the latter.

Figure 13:
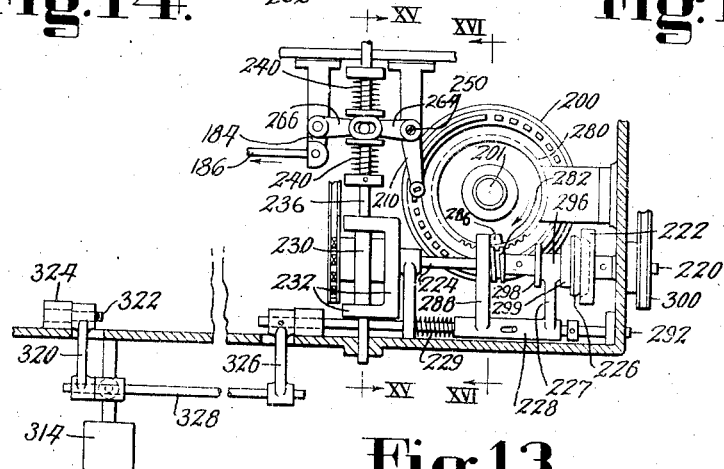
Fig. 13 is a plan view, partly in section, of the right end of the machine shown in Fig. 1 with the uppermost lever arms of Fig. 1 omitted.

For driving the shaft 201 (Figs. 1, 9, 13 and 16) of the controller member 200, there is affixed to said shaft a worm gear 280 with which there is constantly in mesh a worm 282 secured to the shaft 224 arranged to be driven, as heretofore described, by interengaging clutch members 222 and 226 which are normally out of engagement when the machine is at rest, as indicated in Fig. 13. In this top plan view of the parts under discussion, a stop member 286 on the upper surface of the worm gear 280 has operated to move the clutch parts to disengaging position. As shown, the stop member 286 contacts an arm 288 extending from the sleeve member 228 slidably mounted on a shaft 292, the said sleeve 228 being also provided with the arm 227 which has a collar portion 296 loose on the shaft 224 so that it may move lengthwise of said shaft and also to a limited extent transversely of the shaft. The collar portion 296 is positioned between two collars 298, 299 of a sleeve member which carries also the movable clutch member 226. Hence, when the sleeve 228 on the shaft 292 is moved to the left in Fig. 13 through engagement of the stop 286 with the arm 288 of the said sleeve 228, the movable clutch member 226 is moved away from the stationary clutch member 222 on the shaft 220 (Fig. 1). On the other hand, lifting of the arm 288 from the path of the stop member 286 is followed by movement of the sleeve 228 to the right in Figs. 1 and 13 under the pressure of the spring 229, whereby the clutch members 222, 226 are engaged to drive the shaft 201 and with it the controller member 200.

Upon reference to Fig. 1, it will be observed that the shaft 220 has secured thereto a pulley 300 about which passes a belt 302 the other end of which passes around another pulley 304 on a shaft which carries another pulley 306 about which passes a belt 308 driven from a pulley 310 on the main shaft 312.

Figure 17:
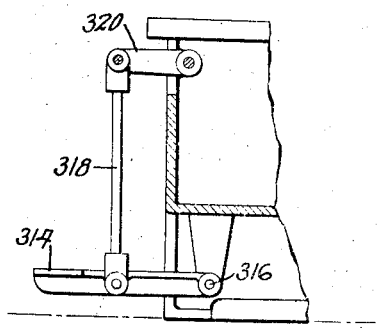
Fig. 17 is a detail of the starting treadle and connections.
Figure 16:
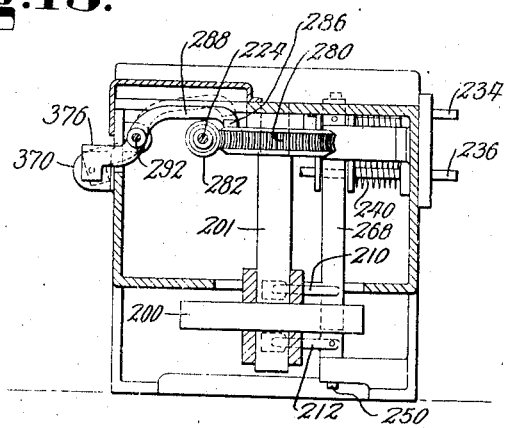
Fig. 16 is a view, partly in section, taken along the line XVI—XVI of Figs. 1 and 13.

For initiating an operation of the machine, there is provided in the illustrated construction a treadle 314 (Figs. 1, 13 and 17) pivoted at 316 on the machine frame, a link 318 being pivotally connected at its lower end to the treadle and at its upper end to an arm 320 rigidly secured to a stub shaft 322 mounted in a bearing 324 (Fig. 13) secured to the frame of the machine. Extending between the outer end of the arm 320 and a similar arm 326 is a bar 328, the arrangement being such that depression of the treadle 314 results in lowering both arms 320, 326 at their outer ends. As shown, the arm 326 is rigidly connected to one end of the shaft 292. Hence, depression of the treadle 314 is accompanied by a lifting of the free end of the arm 288 carried by the sleeve 228 which is pinned to the shaft 292, as clearly shown in both Figs. 1 and 13. With the parts in the position shown in Fig. 13, this depression of the treadle and lifting of the arm 288 is followed by engagement of the clutch parts 222, 226, thus starting the work feeding mechanism of the machine in operation.

As heretofore stated, the glazing tool 74 (Figs. 1 to 4, inclusive, and Fig. 23) is movable back and forth over a bed 76 which supports that portion of the work being treated at the instant against pressure of the tool. As shown, the glazing tool 74 is carried by a member 340 at the forward end of a connecting rod 341 the other end of which is connected to a crank pin 343 on the driven wheel 345. As illustrated, the member 340 is pivoted at 342 (Fig. 23) to the lower end of a lever member 344 pivotally mounted at its upper end on the frame of the machine by a link member 346 and also pivotally mounted at a point between its ends by a link member 348 pivoted at 350 to a lever 352 movable about a pivot 354 carried by the machine frame. At its other end, the lever 352 is pivotally connected by a link 356 with a piston rod 358 rigid with a piston 360 in a piston cylinder 362. When the machine is started in operation by the depression of the treadle 314, a fluid pressure medium enters the lower end of the cylinder 362 thereby raising the piston 360 and causing, through the linkage described, pressure to be exerted in a downward direction upon the tool 74 so that the latter will be effective as a glazing tool while it is being reciprocated. It will be noted that pressure thus applied to the tool 74 is a yielding pressure by reason of the nature of the fluid pressure medium which exerts the pressure. Whereas, in the ordinary commercial glazing machine, the bed which supports the work piece against the thrust of the tool is a yielding member, in the present construction it is the tool that exerts the pressure yieldingly for the reason that the bed 76 should be stationary in order to simplify the construction of the work clamping members 24, 26, 30 and 32, the lower pair of which moves upwardly to press the work piece against the upper pair of work clamping members 24, 26 to engage the work piece and to move it one step and then to hold it while the tool operates on a portion of the work piece exposed between the work clamping members.

In order that pressure will be applied to the tool 74 by pressure medium introduced into the cylinder 362 only when the machine is to operate upon a work piece, there is provided a valve construction comprising a valve cylinder 370 containing a double valve member 372, said valve member having a piston rod 374 secured at its outer end to an arm 376 (Figs. 1 and 23) rigid with the sleeve member 228 which, in connection with the stop 286 and arm 288, is also the clutch controlling member, as described above. When the sleeve 228 moves from its position in Fig. 13 (where the clutch members 222, 226 are in disengaging relation) to the position shown in Fig. 1 where the clutch parts are engaged, the arm 376 on the sleeve 228 causes movement of the valve member 372 to the right in Fig. 23, with the result that pressure medium under pressure passes from the pump 192 through a pipe 380 to the middle part of the cylinder 370 and thence by pipe 382 to the lower end of the piston cylinder 362 whereby upward movement of the piston 360 is produced, such upward movement causing the application of pressure upon the glazing tool 74 through the linkage above described. On the other hand, at the end of one complete rotation of the worm gear 280 (Figs. 1 and 13), when the stop member 286 engages the arm 288 rigid with the sleeve 228 and causes movement of the sleeve to the left from its position in Figs. 1 and 23 to its position in Fig. 13, the valve member 372 is moved to the left in Fig. 23 whereby pressure medium is shut off from the pipe 382 and connected to a pipe 384 which runs to the upper end of the piston cylinder 362, the result being that the piston 360 is depressed, not only removing pressure from the glazing tool 74 but actually lifting the tool to facilitate ready introduction of a piece of work below said tool and into the space between the upper and lower sets of work clamping members. Incidentally, a pipe 386 is provided, with connections opening into each end of the valve chamber 370, to serve as a return for the pressure medium to the reservoir 198.

In operating upon work pieces such as tanned skins with this machine, the operator initially positions a skin between the upper set 24, 26 of work clamping members and the lower set 30, 32 with the body of the skin resting upon the divided work table 73 and with a portion of the skin resting upon the bed 76, a center C in the skin, being initially positioned substantially in the median line of the bed, as indicated in Fig. 3. Upon depressing the treadle 314 the machine starts in operation, a work piece being gripped by the work clamping members and held while the glazing tool makes its operative stroke. Before the next stroke of the tool, the clamping members move laterally to the right in Fig. 3, close upon a fresh portion of the work piece, and then move back to the left in Fig. 3 to position a fresh portion of the work piece for treatment by the glazing tool. This directly lateral movement of the work piece is continued until the center D in the skin reaches the position originally occupied by the center C. At this time the control member 200 shifts operations from the sidewise shifting mechanism for the work clamping members to the rotative mechanism for said members, the result being that the skin is given a step-by-step movement about the center D, the glazing tool operating along paths extending outwardly radially from the center D, until the skin has been turned through substantially 180° whereupon the directly sidewise movement of the skin is resumed through control mechanism of which the most important element is the control member 200. This is continued until the skin is again positioned with the center C in line with the transverse center of the tool 74, as in Fig. 3, whereupon the rotative movement of the work clamping members is resumed under control of the control member 200, such rotative movement of the work clamping members being continued until the skin has been again turned substantially 180° about the center C, whereby the operation upon the skin is completed.

Figure 24:
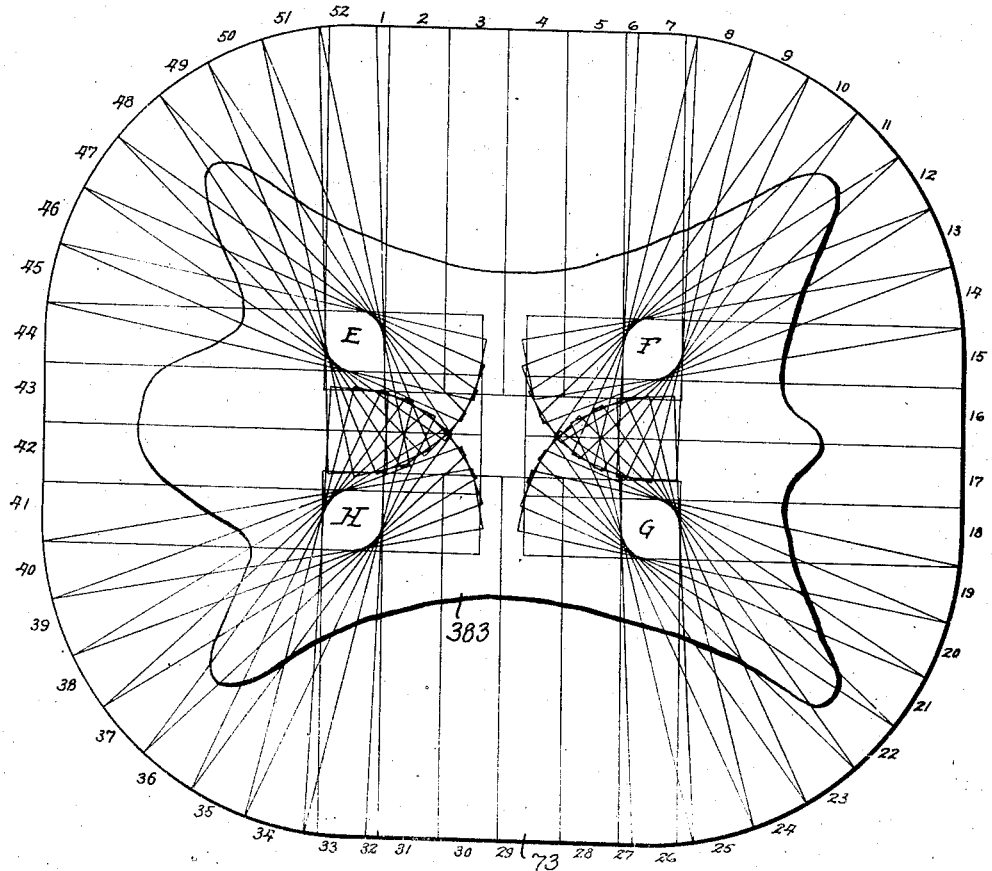
Fig. 24 is a view similar to the showing of the skin in Fig. 3, indicating a somewhat different method of treating the skin.
Figure 25:
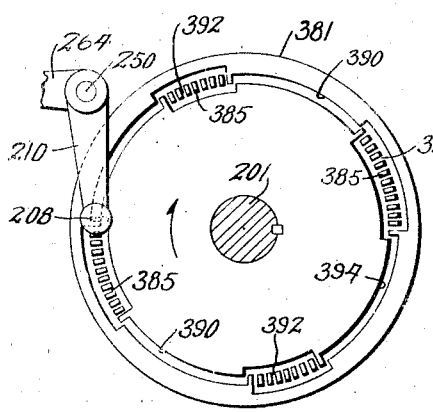
Fig. 25 is a view of a controller member similar to the controller member of Fig. 18.
Figure 26:
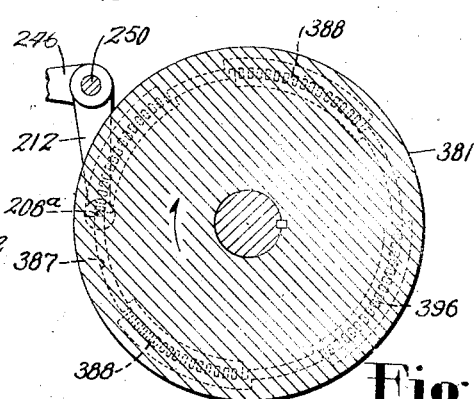
Fig. 26 is a view of the under surface of the controller member shown in Fig. 25.

If it should be decided that, in the method of treatment indicated for the skin in Fig. 3 of the drawings, there is a disadvantage in having too many overlapping strokes of the glazing tool on those portions of the skin adjacent to the points C, D, provision is made for substituting in place of the controller member 200 (Figs. 9, 13, 16, 18 and 20) a controller member 381 (Figs. 25 and 26). In this case the skin 383 will be placed upon the work support 73 (Fig. 3) with a center E above the longitudinal median line of the work supporting bed 76. Upon starting the machine, the controller member 381 turning in the direction of the arrow in Fig. 25 will effect through the connections above described, including the lever arm 210 with its pin 208, shifting of the work clamping members back and forth in directly lateral directions to move the skin 383 step by step to the left in Fig. 24 through six steps during which the glazing tool travels in directions at right angles to the backbone line. The six steps mentioned above are determined by the twelve passageways in the group of passageways 385 (Fig. 25). While the pin 208 in the lever arm 210 is traveling back and forth through the passageways 385 of the upper surfaces of the controller member 380, the pin 208a (Fig. 26) in lever arm 212 was traveling along the curved groove 387 in the bottom surface of the controller member 381, during which time the mechanism for shifting the work clamping members rotatably was out of operation. However, at the end of the sixth step of directly lateral shifting of the skin 383, the center F in the skin reaches the point previously occupied by the center E and at the same time the pin 208a enters the back-and-forth passageway 388 in the bottom of the controller member 381 while at the same time the pin 208 enters the narrow curved passageway 390 (Fig. 25) on the top surface of the controller member. Hence, the directly lateral shifting means for the work clamping members is inoperative while the rotative shifting means is operative and controls shifting of the skin 382 through eight rotative steps about the center F. This is followed by four directly lateral steps (numbered 15 to 18 inclusive in Fig. 24) as determined by the pin 208 on the arm 210 traveling through the back-and-forth passageway 392 in Fig. 25. At the end of the four directly lateral shiftings, the pin 208 enters the narrow curved groove 394 (Fig. 25) while the pin 208a enters the back-and-forth group of passageways 396 (Fig. 26) to control the rotative shiftings of the work clamping members by which the skin is turned about the center G. Subsequently the skin is shifted in a directly lateral direction through six steps while the glazing tool makes strokes on the surface of the skin in directions at right angles to the backbone line, at which time the skin reaches a point where the center H occupies the place just previously occupied by the center G. There follows a rotative shifting about the center H, four lateral shiftings between the centers H and E and a final rotative shifting about the center E to complete the treatment of the skin. In view of the disclosure of the types of controller members in Figs. 18 and 20 and in Figs. 25 and 26, it will be clear that a controller member may be provided similar to the controller member 200 or 381 which will so control the work clamping members that any desirable pattern of strokes of the glazing tool on the surface of the skin may be readily secured.

It will be seen that the operator is charged with the duty of placing the skin in the machine in a correct position, it being obvious that, from the practical standpoint, a certain amount of judgment must be exercised in determining particularly the location of the first center C (Fig. 3) or E (Fig. 24). The operator, however, will quickly become experienced in introducing skins of different sizes within the range of the given size machine selected for the class of work to be treated, it being understood in this connection that one size of this machine will be suitable for operations upon kidskins while another size will undoubtedly be provided for glazing operations upon calfskins.

Since the operator is charged merely with the duty of introducing and removing skins from a given machine, it is expected that he will be able to look after a number of these machines, whereas in the case of glazing machines now commonly provided in the industry an operator can attend only one machine and must give a great deal of time and effort to the manual shifting of the work piece between successive strokes of the glazing tool. It is expected, therefore, that the output of a given operator will be greatly increased and this without any deterioration in the quality of work performed.

Having described my invention, what I claim as new and desire to secure by Letters Patent of the United States is:

1. In a machine for operating upon sheet material having a tool movable over the surface of a work piece, the combination of a work engaging device, means automatically operative to cause said work engaging device to shift the work piece for a predetermined number of steps in a straight line direction while treating one portion of the work piece and means operating in timed relation to the first-mentioned means to cause step by step rotation of said work piece about a given center therein while the tool is treating another portion of the work piece.

2. In a machine for operating upon sheet material having a tool movable alternately in idle and operative strokes over the surface of a work piece, the combination of a work support, a work engaging device having work engaging surfaces on each side of said work support, means automatically operative to cause said work engaging device to shift the work piece for a predetermined number of steps in a directly lateral direction and in alternation with the operative strokes of the tool while treating one portion of the work piece, means to cause step by step rotation of the work piece about a given center in the work piece while the tool is treating another portion of the work piece, and power means to operate the two first-mentioned means in timed relation to each other.

3. In a machine for operating upon sheet material having a tool movable over the surface of a work piece, the combination of a work support, a work engaging device movable to shift the work piece between successive operating movements of the tool, said device having work engaging surfaces on each side of said work support, means to effect bodily movement of the work engaging device to cause shifting of the work piece for a predetermined number of steps in a directly lateral direction and then rotative shifting of said work piece for a predetermined number of steps rotatably about a given center in the work piece, and means operating in timed relation to the first-mentioned means to cause said device to tension that portion of the work between said work engaging surfaces during operation of the tool thereon.

4. In a machine for operating upon sheet material having a tool movable over the surface of a work piece, the combination of a work clamping device comprising an upper and a lower clamping member for engaging opposite surfaces of the work piece, means for causing the clamping members to engage a work piece on opposite surfaces thereof, and means operating in timed relation to the first-mentioned means to move the clamping members back and forth in a straight line direction between successive strokes of the tool and then to move as a unit rotatably about a given center in the work piece and alternately in idle and work feeding movements to secure treatment of another portion of the workpiece.

5. In a machine for operating upon sheet material having a tool movable alternately in idle and operative strokes over the surface of a work piece, the combination of work clamping devices spaced from each other a distance corresponding substantially to the width of said tool, said devices including upper and lower clamping members for engaging opposite surfaces of the work piece, means for causing the clamping members alternately to engage a work piece on opposite surfaces thereof and to release such work piece, and means operating in timed relation to the first-mentioned means to move the clamping members bodily back and forth to feed the work piece between successive strokes of the tool and then to move as a unit rotatably about a given center in the work piece alternately in idle and work feeding movements to secure treatment of another portion of the work piece.

6. In a machine for operating upon sheet material having a tool movable over the surface of a work piece, the combination of a work support to back a portion of the work piece against the thrust of the tool, work clamping devices located upon both sides of the work support and movable to shift the work piece over the surface of the work support between successive operating movements of the tool, said clamping devices being operative to hold the work piece against displacement by said tool during the operative strokes of the latter, and means to cause bodily movement of the work clamping device to effect shifting of the work piece for a predetermined number of steps to feed the work piece in a directly laterally direction and then to effect rotative shifting of the clamping device to cause feeding of the work piece for a predetermined number of steps rotatably about a given center in the work piece.

7. In a machine for operating upon sheet material having a tool movable over the surface of a work piece, the combination of a work engaging member movable to shift the work piece between successive operating movements of the tool, power-operated means for moving the work engaging member rectilinearly and also angularly, and mechanism for controlling the power-operated means arranged to determine the number of rectilinear and angular movements to be imparted to the work engaging member in operating upon different portions of the work piece.

8. In a machine for operating upon sheet material having a tool movable over the surface of a work piece, the combination of a work support, a work feeding device movable to shift the work piece over the work support between successive operating movements of the tool, power-operated means for moving the work feeding device rectilinearly and also angularly, and mechanism for controlling the power-operated means arranged to determine the number of rectilinear and angular movements to be imparted to the work feeding device in operating upon different portions of the work piece.

9. In a machine for operating upon sheet material having a tool movable over the surface of a work piece, the combination of a work support, a work clamping device, a slide member to support said device, means to operate said slide member to cause said clamping device to shift the work piece over the work support between successive operating movements of the tool, and a control member for the clamping device to cause the latter to shift the work piece a predetermined distance in a directly lateral direction and subsequently step by step rotatably about a center in one portion of the sheet material.

10. In a machine for operating upon sheet material having a tool movable over the surface of a work piece, the combination of a work support, a work engaging device movable to shift the work piece on the work support between successive operating movements of the tool, and a control member for the work engaging device whereby the latter is operated to shift the work piece in a directly lateral direction and subsequently step by step rotatably about a center in one portion of the sheet material, said control member comprising a rotary disk or wheel having its opposite surfaces provided with grooves to serve as control surfaces for the work clamping device.

11. In a machine for operating upon sheet material having a tool movable over the surface of a work piece, the combination of a work support, a work clamping device movable to shift the work piece on the work support between successive operating movements of the tool, means for moving the work clamping device back and forth in directly lateral directions to effect step by step feeding of the work piece in a rectilinear direction, other means for shifting the work clamping device rotatably in reverse directions whereby the work piece is shifted step by step about a given center, and a control member operative to determine the time of operation of both said means whereby the work piece is shifted a predetermined number of times in a sidewise direction and then rotatably for a predetermined number of times in another direction.

12. In a machine for operating upon sheet material having a tool movable over the surface of a work piece, the combination of a work feeding device movable to shift the work piece between successive operating movements of the tool, fluid-operated means for operating the work feeding device to effect movement of the work piece in directly lateral directions and also rotatively about a center in the work piece, and control mechanism to determine the time and the extent of the directly lateral movements and of the rotative movements of the work piece by said work feeding device.

13. In a machine for operating upon sheet material having a tool movable over the surface of a work piece, the combination of a work support, a work engaging device movable to shift the work piece on the work support between successive operating movements of the tool, fluid-operated means for operating the work engaging device to effect movement of the work piece in lateral directions and also rotatively about a center in the work piece, and control mechanism for the fluid-operated means to determine the number and the sequence of the lateral movements and of the rotative movements of the work piece by said work engaging device.

14. In a machine for operating upon sheet material having a tool movable over the surface of a work piece, the combination of a work feeding device movable to shift the work piece between successive operating movements of the tool, fluid-operated means for operating the work feeding device to effect movement of the work piece in directly lateral directions, a second fluid-operated means to effect rotative movement of the work feeding device, and means for starting said fluid-operated means in operation in predetermined time sequence.

15. In a machine for operating upon sheet material having a tool movable over the surface of a work piece, the combination of a work feeding device movable to shift the work piece between successive operating movements of the tool, fluid-operated means for operating the work feeding device to effect movement of the work piece in directly lateral directions, a second fluid-operated means to effect rotative movement of the work feeding device, and means for controlling said fluid-operated means to cause said work feeding device to rotate the work piece through a predetermined angle after the work piece has been moved in each lateral direction to a predetermined extent.

16. In a machine for operating upon sheet material having a tool movable over the surface of a work piece, the combination of a work support, a work engaging device movable to shift the work piece on the work support between successive operating movements of the tool, fluid-operated means for operating the work engaging device to effect movement of the work piece in directly lateral directions, a second fluid-operated means for the work engaging means to effect rotative movement of the work piece, and means for controlling said fluid-operated means to predetermine the number and the sequence of the lateral and rotative movements of the work piece.

17. In a machine for operating upon sheet material having a tool movable over the surface of a work piece, the combination of a work support, a work engaging device movable to shift the work piece on the work support between successive operating movements of the tool, fluid-operated means for operating the work engaging device to effect movement of the work piece in lateral directions, a second fluid-operated means for the work engaging means to effect rotative movement of the work piece, and means for controlling said fluid-operated means to cause said work engaging device to rotate the work piece step by step through an angle of substantially 180° after each travel of the work piece through a predetermined distance in a lateral direction.

18. In a machine for operating upon sheet material having a tool movable over the surface of a work piece, the combination of a work clamping device movable to shift the work piece between successive operating movements of the tool, means for causing bodily movement of the work clamping device back and forth in a directly lateral direction to effect step by step feeding of the work piece in a rectilinear direction, means for operating the work clamping device rotatably in reverse directions about a center in said work piece to rotate the work piece step by step about said center, and a member operative to control both of said means to provide a dwell in the operation of one of said means while the other is operating, and to determine the number of steps in both the lateral and the rotative directions.

19. In a machine for operating upon sheet material having a tool movable over the surface of a work piece, the combination of a work support, a work clamping device located at one side of the work support and movable to shift the work piece over the surface of the work support between successive operating movements of the tool, means for effecting movement of the work clamping device back and forth to feed the work piece a predetermined number of steps in a directly lateral direction, means for operating the work clamping device rotatively in reverse directions to engage and feed the work piece rotatably for a predetermined number of steps about a center in said work piece, and a control member having surfaces to control both of said means, one portion of said controlling surface being operative to provide a dwell in the operation of one of said means while the other is operating.

20. In a machine for operating upon sheet material having a tool movable over the surface of a work piece, the combination of a work support, a work clamping device movable to shift the work piece on the work support between successive operating movements of the tool, fluid-operated means for operating the work clamping device to effect movement of the work piece in directly lateral directions, a second fluid-operated means to effect rotative movement of the work clamping device, and a control member having surfaces constructed and arranged to determine the time of operating of the two fluid-operated means.

21. In a machine for operating upon sheet material having a tool movable over the surface of a work piece, the combination of a work support, a work engaging device movable to shift the work piece on the work support between successive operating movements of the tool, fluid-operated means for operating the work engaging device to effect movement of the work piece in directly lateral directions, a second fluid-operated means to effect rotative movement of the work engaging device to feed the work piece step by step about a center therein, and a control member having surfaces constructed and arranged to determine the time of operating of the two fluid-operated means, said control member having on its opposite surfaces operating devices to effect control of the fluid-operated means together with means to effect a dwell in the operation of one of the fluid-operated means while the other is operating, whereby the work engaging device is caused to move the work piece successively in directly lateral steps and then in rotative steps.

22. In a machine for operating upon sheet material having a tool movable over the surface of a work piece, the combination of a work engaging device, means for moving the work engaging device back and forth in directly lateral directions and subsequently rotatably about a given center in the work piece, and a rotary control member having its opposite surfaces provided with controlling grooves arranged in alternation with a series of passageways effective to produce back and forth movements of the work engaging device of both the lateral and rotative type, and one side of the control member having its grooves and groups of passageways arranged in alternation with respect to the grooves and groups of passageways on the other sides of the disk whereby a groove on one side of the control member provides for a dwell in either the lateral or the rotative steps of the work engaging device while the group of passageways on the other side of the disk is effective to provide either a rotative or lateral series of steps of the work engaging device.

23. In a machine for operating upon sheet material having a tool movable over the surface of a work piece, the combination of a work clamping device including upper and lower work clamping members, means for effecting relative approaching and separating movements of the work clamping members first to clamp the work piece and subsequently to release it, means operating in timed relation to the first-mentioned means for moving the work clamping device back and forth in directly lateral directions and subsequently rotatably about a given center in the work piece to effect feeding of the work piece step by step, and a rotary control member in the form of a disk having its opposite surfaces provided with controlling grooves arranged in alternation with a series of passageways effective to produce movements of the work clamping device of both the lateral and rotative type, and one side of the disk having its grooves and groups of passageways arranged in alternation with respect to the grooves and groups of passageways on the other sides of the disk whereby a groove on one side of the disk provides for a dwell in either the lateral or the rotative steps of the clamping device while a group of passageways on the other side of the disk is effective to provide either a rotative or lateral series of steps of the work clamping device.

24. In a machine for operating upon sheet material having a tool movable along a path on the surface of a work piece, the combination of work clamping devices spaced from each other a distance corresponding substantially to the width of said tool, said devices including upper and lower clamping members for engaging opposite surfaces of the work piece for a substantial distance along each side of the path of the tool, means for causing the clamping members to engage a work piece on opposite surfaces thereof, means for causing the upper and lower clamping members to move relatively away from each other to release the work piece and to move as a unit in a directly lateral direction to engage another portion of the work piece and then to move back again to place a fresh portion of the work piece in position for treatment by said tool, and means including said clamping devices for holding the work piece against displacement while the tool engages a portion of the work piece between said clamping devices and then moves along said path in a direction away from the devices.

25. In a machine for operating upon sheet material having a tool movable back and forth above the surface of a work piece, the combination of work clamping devices spaced from each other a distance corresponding substantially to the width of said tool, said devices including upper and lower clamping members for engaging opposite surfaces of the work piece, means for causing the clamping members to engage a work piece on opposite surfaces thereof, means for causing the upper and lower clamping members to move relatively away from each other to release the work piece and then to move as a unit in a directly lateral direction to engage another portion of the work piece and then to move back again to place a fresh portion of the work piece in position for treatment by said tool, and means automatically operative in timed relation to all said means to produce a predetermined number of straight-line back and forth shiftings of the work clamping devices to feed the work piece between successive operations of the tool and subsequently to effect rotative shiftings of the work clamping devices about a given center in the work piece to position the latter for successive treatments of other portions of said work piece.

26. A machine according to claim 25 in which a control member is provided to determine not only the number of straight-line and rotative shiftings of the work clamping feed device but also the sequence of the two types of shiftings.

27. In a machine for operating upon sheet material having a tool movable alternately in idle and operative strokes over the surface of a work piece the combination of work clamping devices spaced from each other a distance corresponding substantially to the width of said tool, said devices including upper and lower clamping members for engaging opposite surfaces of the work piece, means for causing the clamping members to engage a work piece on opposite surfaces thereof, said work clamping devices being movable away from each other to place a portion of the work piece under tension prior to the operation of the tool thereon, means for causing the upper and lower clamping members to move relatively away from each other to release the work piece and to move as a unit in a lateral direction to engage another portion of the work piece and then to move back again to place a fresh portion of the work piece in position for treatment by said tool, and means operating in timed relation to said means to produce a predetermined number of straight line lateral shiftings of the work clamping devices to feed the work piece between successive operations of the tool and then to effect rotative shiftings of the work clamping devices about a given center in the work piece to position the latter for successive treatments of other portions of said work piece.

ERASTUS E. WINKLEY.